(12) United States Patent
Imai

(10) Patent No.: US 7,900,936 B2
(45) Date of Patent: Mar. 8, 2011

(54) METAL GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 12/000,034

(22) Filed: Dec. 7, 2007

(65) Prior Publication Data

US 2008/0136119 A1     Jun. 12, 2008

(30) Foreign Application Priority Data

Dec. 7, 2006  (JP) .................... 2006-330221

(51) Int. Cl.
*F02F 11/00* (2006.01)
*F16J 15/02* (2006.01)
(52) U.S. Cl. ....................................... 277/598
(58) Field of Classification Search ........... 277/590, 277/591, 592, 593, 630, 598, 370, 421, 551
See application file for complete search history.

(56) References Cited

U.S. PATENT DOCUMENTS

| 4,648,607 | A | * | 3/1987 | Yamada et al. ............... 277/598 |
| 5,060,390 | A | * | 10/1991 | Hill ............................... 33/1 SD |
| 5,281,464 | A | * | 1/1994 | Sekioka et al. ............... 277/630 |
| 5,806,857 | A | * | 9/1998 | Mockenhaupt et al. ...... 277/595 |
| 6,386,549 | B1 | * | 5/2002 | Johnson ......................... 277/592 |
| 6,409,178 | B1 | * | 6/2002 | Raden et al. .................. 277/592 |
| 7,070,187 | B2 | * | 7/2006 | Boeve ............................ 277/598 |

* cited by examiner

*Primary Examiner* — Shane Bomar
*Assistant Examiner* — Gilbert Y Lee
(74) *Attorney, Agent, or Firm* — Manabu Kanesaka

(57) ABSTRACT

A metal gasket includes a first metal plate having positioning holes, and a second metal plate laminated under the first metal plate. The second metal plate has positioning projections facing corresponding positioning holes and fitted into the facing corresponding positioning holes. At least one of the positioning holes does not match the other of the positioning holes in case the position holes are overlapped, and at least one of the positioning projections is not fitted into the other of the positioning holes.

12 Claims, 7 Drawing Sheets

METAL GASKET

BACKGROUND OF THE INVENTION AND RELATED ART STATEMENT

The present invention relates to a metal gasket which is formed by laminating metal plates and held between two members for sealing. More specifically, the invention relates a metal gasket which can prevent erroneous assembly.

For an automobile engine, metal gaskets such as a gasket sealing a simple sealing-target hole at an intake manifold or exhaust manifold and so on; or a cylinder head gasket sealing between a cylinder head and a cylinder block, are used. The above-mentioned metal gaskets are manufactured by laminating multiple metal plates with different materials, thicknesses, or processes, and in order to obtain a desired sealing capability, these multiple metal plates are required to be laminated in a correct direction on a correct side in a correct order.

However, in many cases, the shapes of the metal plates have roughly the same configuration, so that it is difficult to determine the directions, front or back sides, or the assembling sequence of the lamination of the metal plates. In such a case, when the metal plates are laminated, the direction, front and back sides, and assembling sequence of the lamination may be easily mistaken.

In order to solve the above-mentioned problem, a laminated metal plate gasket with a label such as a notch, engraved mark, marking and the like for recognizing the number of the assembling sequence of each metal plate of the gasket, is proposed (for example, refer to Japanese Patent Publication (JIKKAI) No. H6-85963), so that the number of the assembling order of each single structural plate of the laminated metal gasket can be clearly recognized.

However, even with the structure which is visually recognizable as mentioned above, man-caused mistakes cannot be completely prevented. Moreover, a device for preventing an erroneous assembly is required.

This invention is made in order to solve the problems described above, and an object of the present invention is to provide a metal gasket which is formed by laminating multiple metal plates, and can be easily recognized by an assembler or observer when the direction, front and back sides, or assembling sequence of the lamination of the metal plates are incorrect, and to provide a method of manufacturing the same.

Further objects and advantages of the invention will be apparent from the following description of the invention.

SUMMARY OF THE INVENTION

In order to achieve the object described above, according to the present invention, a metal gasket which is formed by laminating three or more metal plates and held between two members for sealing a sealing hole, is provided. A first metal plate includes multiple positioning holes, and the multiple positioning holes are structured in such a way that at least one positioning hole does not have the other positioning hole in shape when they overlap with respect to a predetermined direction determined by the planar shape of the metal gasket. In a second metal plate which is located under the first metal plate when they are laminated, a positioning projection fitted into the facing positioning hole is formed in such a way that the upper side is smaller than the lower side, in a position facing the positioning hole of the first metal plate. Also, one positioning projection is formed so as not to be fitted into the other positioning hole. In a third metal plate which is located on the upper side of the first metal plate when the metal plates are laminated, a positioning hole is made smaller than the overlapped positioning hole of the first metal plate and is fitted into the positioning projection projecting from the overlapped positioning hole. The positioning hole is shaped not to include or match the other small positioning hole in shape when they overlap with respect to the predetermined direction.

Also, in the metal gasket, the positioning holes of the first metal plate are shaped in such a way that one positioning hole does not match the other positioning hole, so that when the first metal plate is placed over the second metal plate, the position holes do not properly enter the positioning projection with respect to the wrong direction. The small positioning holes of the third metal plate are made differently. When the third metal plate is placed over the first metal plate, the small positioning holes of the third metal plate do not properly enter the positioning projections with respect to the wrong direction.

Alternatively, in order to achieve the above-mentioned object, the metal gasket according to the present invention is formed by laminating two sheets of metal plates, and is held between two members to seal the sealing-target hole. Multiple positioning holes are provided on the first metal plate, and shaped in such a way that one positioning hole does not include or match the other positioning hole. In the second metal plate which is located under the first metal plate when the metal plates are laminated, the positioning projections are fitted into the facing positioning holes of the first metal plate. Also, the positioning projections are formed in such a way so as not to fit the wrong positioning holes.

Also, in the metal gasket, the multiple positioning holes of the first metal plate are shaped not to match with respect to each other.

In order to achieve the above-mentioned object, in a method of manufacturing the metal gasket according to the invention, the metal plates are connected by flatly crushing the tip of the positioning projection projecting from the small positioning hole or the positioning hole of the metal plate which is located on the top side when the metal plates are laminated.

In the above gasket, the direction or front and back sides of the metal plate can be easily mistaken when each metal plate is seen. Especially, when a manifold gasket has a square or rectangular shape, the metal plate can be laminated in a wrong direction. In the present invention, the metal plates can be easily laminated properly, and if the lamination direction is wrong, the wrong lamination can be easily recognized.

Also, the relationship wherein one does not include or match the other when they overlap indicates the relationship wherein one of the positioning holes does not match the other positioning hole, i.e. the other positioning hole is not completely inserted into the wrong positioning projection.

According to the metal gasket and the method of manufacturing the same of the invention, when the assembly is performed normally, the positioning projections and positioning holes are fitted. When the direction, front and back sides, and the assembling sequence of the lamination of the metal plates are incorrect, the metal plates cannot be fitted to one another. As a result, an assembler or observer can easily recognize a mistake when the direction, front and back sides, and assembling sequence of the lamination of the metal plates are incorrect, so that an erroneous assembly can be prevented.

DETAILED DESCRIPTION OF PREFERRED EMBODIMENTS

Figure 1:
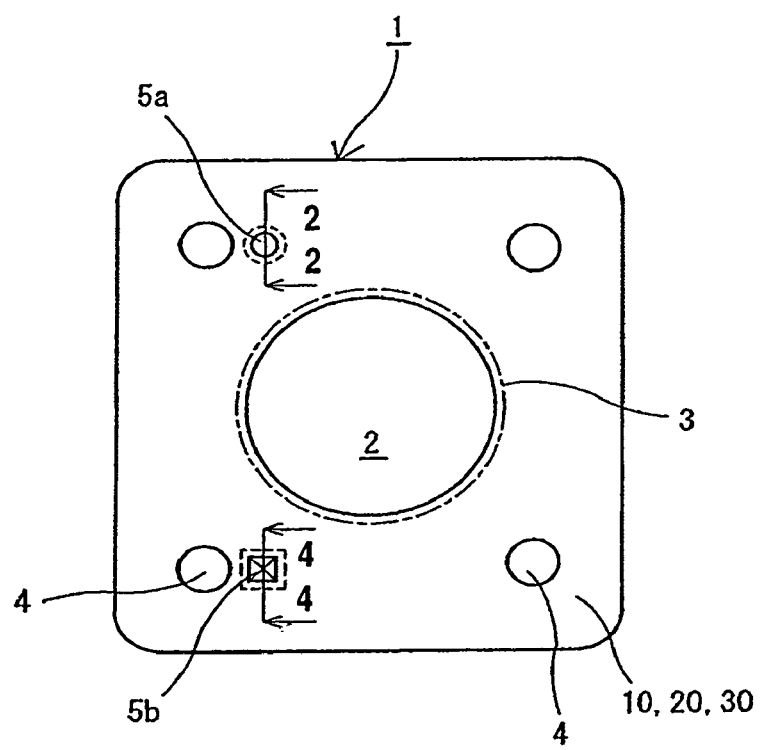
FIG. 1 is a plan view showing a metal gasket of the first embodiment of the present invention.

Hereunder, embodiments of a metal gasket and a method of manufacturing the same according to the present invention will be described with reference to the attached drawings as examples of the metal gasket held between an exhaust manifold for an engine and a flange for an exhaust pipe. However, this invention is not limited to the embodiment and can be applied to, for example, other metal gaskets such as a gasket for an intake manifold, cylinder head gasket and so on. Incidentally, FIGS. 1-20 are schematic explanatory views in which thicknesses of plates, and sizes of sealing-target holes, beads, positioning holes, positioning projections and so on are different from actual ones and enlarged for the sake of explanation.

First, the metal gasket of the first embodiment of the invention will be explained. As shown in FIGS. 1-5, the metal gasket 1 of the first embodiment includes three metal structural plates 10, 20, 30 manufactured by matching to the shape of the flange of the exhaust pipe. The first to third metal structural plates 10, 20, 30 are formed by a mild steel plate, stainless annealed material (anneal material), stainless thermal refining material (spring steel plate) and so on according to demand to each metal plate.

In the first to third metal structural plates 10, 20, 30, sealing-target holes 2 are punctured, widely known sealing means such as a full bead 3 and so on are provided around the sealing-target holes 2, and bolt holes 4 for tightening bolts are formed in four directions.

The first metal plate 10 includes multiple positioning portions 5a, 5b shaped in such a way that one of the positioning portions 5a, 5b does not include the other positioning portions 5a, 5b when they overlap with respect to a predetermined direction determined by a planar shape of the metal gasket 1. In the embodiment, a first positioning hole 12a of the first positioning portion 5a is roundly punctured, and a second positioning hole 12b of the second positioning portion 5b is squarely punctured.

The predetermined direction determined by the planar shape of the metal gasket 1 indicates a direction wherein the direction; front and back sides; or the assembling sequence of the lamination of each metal plate 10, 20, 30 can be easily mistaken when they are seen from this direction. However, when the planar shape is a roughly line symmetry, the predetermined direction indicates the direction of a symmetric line of the line symmetry. Usually, in many cases, the metal gasket 1 is formed in a nearly square or rectangular shape, so that the predetermined direction is a lengthwise direction and crosswise direction. The relationship whether or not one of the positioning portions includes the other positioning portions, may be established by the predetermined direction, for example, lengthwise and crosswise, and is not necessarily required to be established in all directions.

Figure 3:
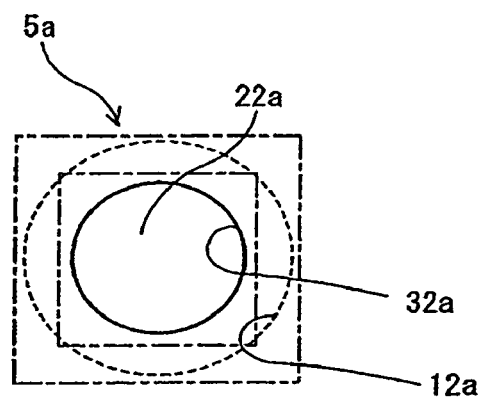
FIG. 3 is a fragmentary plan view showing the structure of a first positioning portion in FIG. 1.
Figure 5:
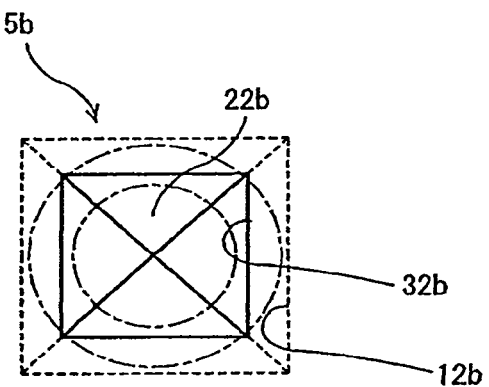
FIG. 5 is a fragmentary plan view showing the structure of a second positioning portion in FIG. 1.

As shown in FIGS. 3 and 5, the relationship whether or not one of the positioning portions includes the other positioning portions when they overlap, indicates the relationship in which the circular first positioning hole 12a does not include the square second positioning hole 12b, i.e. the second positioning hole 12b does not completely enter the first positioning hole 12a.

Therefore, even if quadrangle and rhombus are the same shape, as in the case of the square or rectangular gasket, if the predetermined direction determined by the shape of the metal gasket 1 is only lengthwise and crosswise, one of the positioning portions does not include the other positioning portions. However, if the shape of the metal gasket is an octagon or circular form, and also the predetermined direction determined by the shape of the gasket has a direction of 45 degrees on the diagonal in addition to the lengthwise and crosswise, the quadrangle and rhombus of the same shape overlap completely when one of the positioning portions rotates 45 degrees. As a result, with respect to the direction of 45 degrees (predetermined direction), one of the positioning portions includes the other positioning portion.

The second metal plate 20 is laminated under the first metal plate 10. In the second metal plate 20, a first positioning projection 22a fitted into the facing first positioning hole 12a is formed in such a way that the upper portion of the first positioning projection 22a becomes smaller than the bottom portion of the first positioning projection 22a, in a position facing the first positioning hole 12a of the first metal plate 10. The shape of the first positioning projection 22a may be taper-like or step-like. Additionally, in a position facing the second positioning hole 12b of the first metal plate 10, a second positioning projection 22b fitted into the facing second positioning hole 12b is formed in such a way that the upper portion of the second positioning projection 22b becomes smaller than the bottom portion of the second positioning projection 22b. In this embodiment, the first positioning projection 22a is formed in a conical shape, and the second positioning projection 22b is formed in a pyramid shape with a square bottom face.

The third metal plate 30 is laminated on the upper side of the first metal plate 10. In the third metal plate 30, a third positioning hole 32a which is smaller than the first positioning hole 12a is provided in such a way as to be fitted with the first positioning projection 22a projecting from the overlapping first positioning hole 12a, in a position overlapping the first positioning hole 12a of the first metal plate 10. Additionally, in a position overlapping the second positioning hole 12b of the first metal plate 10, a fourth positioning hole 32b which is smaller than the second positioning hole 12b is formed in such a way as to be fitted with the second positioning projection 22b projecting from the overlapping second positioning hole 12b.

In addition, as in the cases of the first positioning hole 12a and second positioning hole 12b, with respect to the predetermined direction determined by the planar shape of the metal gasket 1, the third positioning hole 32a and fourth positioning hole 32b are shaped in such a way that one of the positioning holes does not include the other positioning hole when they overlap. In this embodiment, the third positioning hole 32a is roundly punctured, and the fourth positioning hole 32b is squarely punctured.

Shapes of the positioning holes 12a, 12b, 32a, 32b can be an ellipse, oval, triangle, quadrangle, polygonal shape, star shape and so on in addition to a circular or square form, and also the positioning projections 22a, 22b can be a shape corresponding to the above-mentioned shapes. Essentially, these shapes may be a shape satisfying the above-mentioned requirement with respect to shapes of the holes and the positioning projections.

Figure 2:
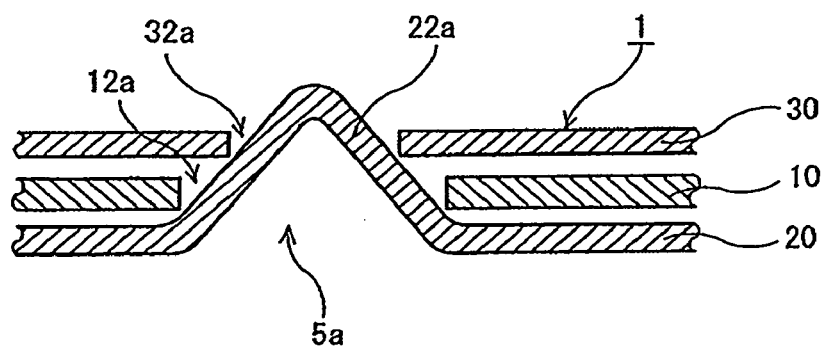
FIG. 2 is a sectional view taken along line 2-2 in FIG. 1.
Figure 4:
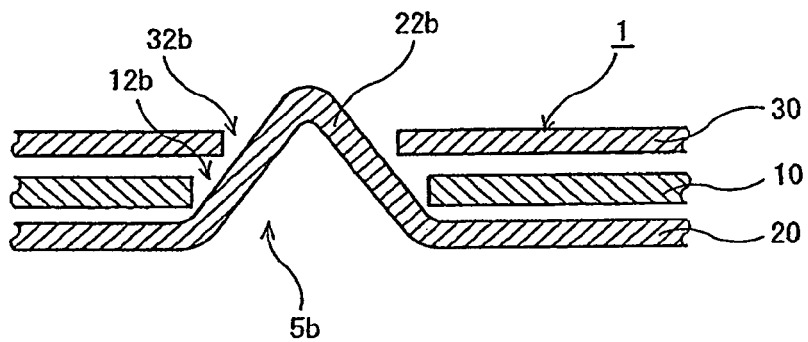
FIG. 4 is a sectional view taken along line 4-4 in FIG. 1.

Next, a method of manufacturing the metal gasket 1 will be explained. As shown in FIGS. 2 and 4, the first to third metal plates 10, 20, 30 are laminated, and assembled to the metal gasket 1 as shown in FIG. 1. During the assembly, when the metal plate 10 is laminated to the metal plate 20 in a state wherein the front and back of the metal plate 10 are opposite, the second positioning hole 12b faces the first positioning projection 22a, and the first positioning hole 12a faces the second positioning projection 22b. Therefore, when the front and back are opposite, the second positioning projection 22b and the facing first positioning hole 12a cannot be fitted to each other.

Also, when the metal plate 30 is laminated to the metal plate 10 in a state wherein the front and back are opposite, the fourth positioning hole 32b faces the first positioning projection 22a, and the third positioning hole 32a faces the second positioning projection 22b. Therefore, when the front and back are opposite, the second positioning projection 22b and the facing third positioning hole 32a cannot be fitted to each other.

Also, when the third metal plate 30 is laminated on the second metal plate 20 by mistake, the third positioning hole 32a or fourth positioning hole 32b, which is formed in a smaller size, faces the first positioning projection 22a; and the fourth positioning hole 32b or third positioning hole 32a, which is formed in the smaller size, faces the second positioning projection 22b. Therefore, the second positioning projection 22b cannot be fitted into the wrong fourth positioning hole 32b or third positioning hole 32a.

Thus, if the assembly is not performed correctly, the second positioning projection 22a, first positioning hole 12b and third positioning hole 32b cannot be fitted to each other, so that the positioning portions 5a, 5b are not laminated suitably with the first to third metal plates 10, 20, 30, and an assembler or observer can easily recognize the mistake. In this case, the front and back sides, attaching direction, and assembling sequence of the lamination of the metal plates 10, 20, 30 are correctly prepared, and the metal plates 10, 20, 30 are assembled again, or once they are removed from the manufacturing line, and once again, correct front and back sides, correct direction, and correct assembling sequence of the lamination are prepared and returned to the manufacturing line.

On the other hand, when the first to third metal plates 10, 20, 30 are correctly laminated, the respective positioning projections 22a, 22b and respective positioning holes 12a, 32a, 12b, 32b are fitted to one another, so that the first to third metal plates 10, 20, 30 are laminated normally. In this case, the respective positioning projections 22a, 22b projecting from the respective positioning holes 32a, 32b of the third metal plate 30 is pressed by a press and the like, crushed flatly, and press fitted, so that the first to third metal plates 10, 20, 30 are connected.

Next, the metal gasket of the second embodiment of the invention will be explained. As shown in FIGS. 6-10, in a metal gasket 1A of the second embodiment, only the following respect differs from the metal gasket 1 of the first embodiment, and the other structures are the same.

In the first metal plate 10A, multiple positioning portions 5Aa, 5Ab are provided and shaped in such a way that one of the positioning portions 5Aa, 5Ab does not include the other positioning portions 5Aa, 5Ab when they overlap with respect to the predetermined direction determined by the planar shape of the metal gasket 1A. In the embodiment, a first positioning hole 12Aa of the first positioning portion 5Aa is roundly punctured, and a second positioning hole 12Ab of the second positioning portion 5Ab is squarely punctured.

Figure 8:
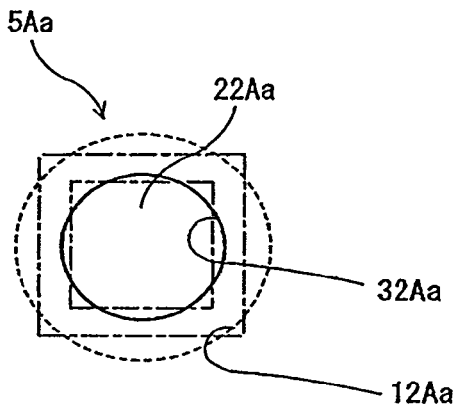
FIG. 8 is a fragmentary plan view showing the structure of the first positioning portion in FIG. 6.
Figure 10:
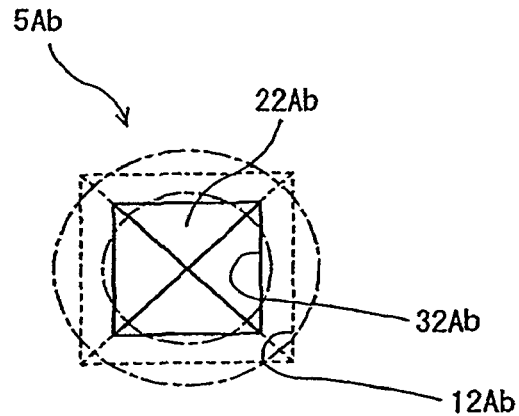
FIG. 10 is a fragmentary plan view showing the structure of the second positioning portion in FIG. 6.

As shown in FIGS. 8 and 10, the relationship in which one of the positioning portions 5Aa, 5Ab does not include the other positioning portions 5Aa, 5Ab when they overlap, is shown, wherein not only the second square positioning hole 12Ab is not completely inserted into the first circular positioning hole 12Aa, but the first positioning hole 12Aa is not completely inserted into the second positioning hole 12Ab.

Also, in the third metal plate 30A, as in the cases of the first positioning hole 12Aa and second positioning hole 12Ab, a third positioning hole 32Aa and fourth positioning hole 32Ab are shaped in such a way that one of the third positioning hole 32Aa and fourth positioning hole 32Ab does not include the other third positioning hole 32Aa and fourth positioning hole 32Ab when they overlap with respect to the predetermined direction determined by the planar shape of the metal gasket 1A. In this embodiment, the third positioning hole 32Aa is roundly punctured, and the fourth positioning hole 32Ab is squarely punctured.

Figure 6:
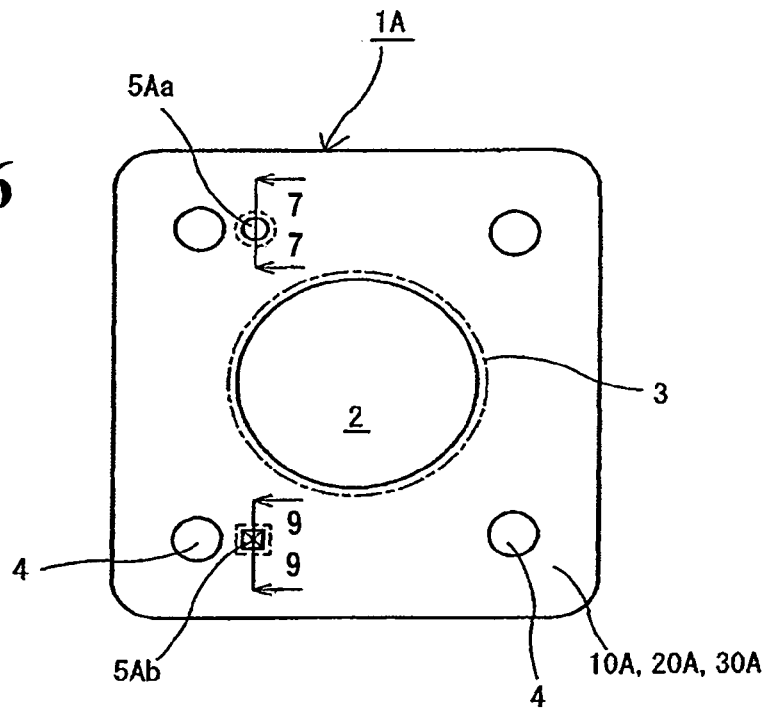
FIG. 6 is a plan view showing the metal gasket of the second embodiment of the present invention.
Figure 7:
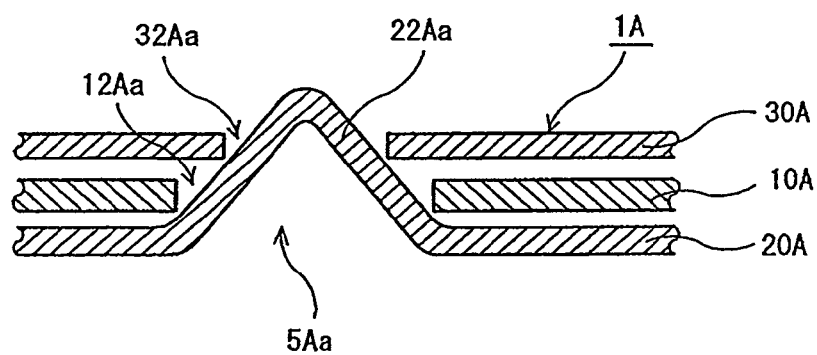
FIG. 7 is a sectional view taken along line 7-7 in FIG. 6.
Figure 9:
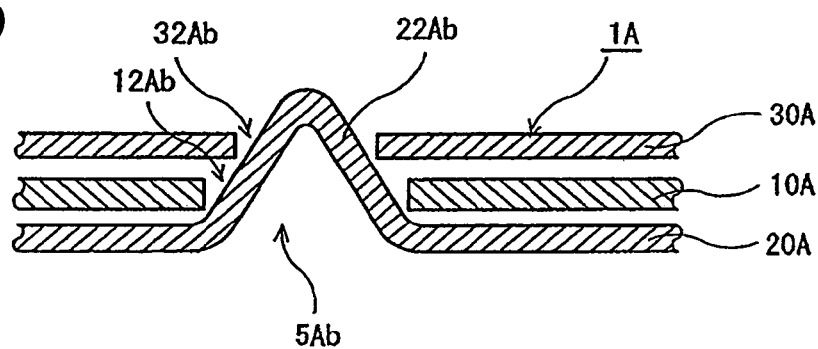
FIG. 9 is a sectional view taken along line 9-9 in FIG. 6.

Next, a method of manufacturing the metal gasket 1A will be explained. As shown in FIGS. 7 and 9, the first to third metal plates 10A, 20A, 30A are laminated, and assembled to the metal gasket 1A as shown in FIG. 6. During the assembly, when the front and back sides of the respective metal plates 10A, 30A are laminated incorrectly, the second positioning hole 12Ab or the fourth positioning hole 32Ab faces a first positioning projection 22Aa, and the first positioning hole 12Aa or the third positioning hole 32Aa faces a second positioning projection 22Ab. Therefore, when the front and back sides are incorrect, both of the positioning projections 22Aa, 22Ab cannot be fitted into the facing positioning holes 12Ab, 32Ab, 12Aa, 32Aa respectively.

Also, when the third metal plate 30A is laminated on the second metal plate 20A by mistake, the fourth positioning hole 32Ab faces the first positioning projection 22Aa; and the third positioning hole 32Aa faces the second positioning projection 22Ab. Therefore, both the positioning projections 22Aa, 22Ab cannot be fitted into the facing positioning holes 32Ab, 32Aa respectively.

Thus, if the assembly is not performed correctly, the positioning projections 22Aa, 22Ab and the positioning holes 12Aa, 32Aa, 12Ab, 32Ab can not be fitted to one another, so that the first to third metal plates 10A, 20A, 30A are not laminated suitably, and the assembler or observer can more easily recognize the mistake compared to the case of the metal gasket 1 of the first embodiment.

On the other hand, when the first to third metal plates 10A, 20A, 30A are correctly laminated, the positioning projections 22Aa, 22Ab and the positioning holes 12Aa, 32Aa, 12Ab, 32Ab can be fitted to one another, so that the first to third metal plates 10A, 20A, 30A are laminated normally. In this case, the positioning projections 22Aa, 22Ab projecting from the positioning holes 32Aa, 32Ab of the third metal plate 30A is pressed by the press and the like, crushed flatly, and press fitted, so that the first to third metal plates 10A, 20A, 30A are connected.

Next, the metal gasket of a third embodiment of the invention will be explained. As shown in FIGS. 11-15, a metal gasket 1B of the third embodiment consists of two sheets of metal structural plates 10B, 20B manufactured by matching to the shape of the flange of the exhaust pipe. The first and second metal structural plates 10B, 20B are formed by a mild steel plate, stainless annealed material (anneal material), stainless thermal refining material (spring steel plate) and so on according to a demand to each metal plate.

In the first and second metal structural plates 10B, 20B, the sealing-target holes 2 are punctured, the widely known sealing means such as the full bead 3 and so on are provided around the sealing-target holes 2, and the bolt holes 4 for tightening the bolt are formed in four directions.

The first metal plate 10B includes multiple positioning holes 5Ba, 5Bb shaped in such a way that one of the positioning holes 5Ba, 5Bb does not include the other positioning holes 5Ba, 5Bb when they overlap with respect to a predetermined direction determined by the planar shape of the metal gasket 1B. In the embodiment, a first positioning hole 12Ba is roundly punctured, and a second positioning hole 12Bb is squarely punctured.

The predetermined direction determined by the planar shape of the metal gasket 1B, and the relationship wherein one of the positioning holes 5Ba, 5Bb does not include the other positioning holes 5Ba, 5Bb when they overlap, are the same as in the case of the first embodiment.

Also, the second metal plate 20B is laminated under the first metal plate 10B. In the second metal plate 20B, a first positioning projection 22Ba fitted into the facing first positioning hole 12Ba is formed in a position facing the first positioning hole 12Ba of the first metal plate 10B. Additionally, in a position facing the second positioning hole 12Bb of the first metal plate 10B, a second positioning projection 22Bb fitted into the facing second positioning hole 12Bb is formed. In this embodiment, the first positioning projection 22Ba is formed in a conical shape, and the second positioning projection 22Bb is formed in a pyramid shape with a square bottom face so as to be easily able to be laminated during the assembly as guidance. However, the tip side is not necessarily required to be smaller.

Figure 11:
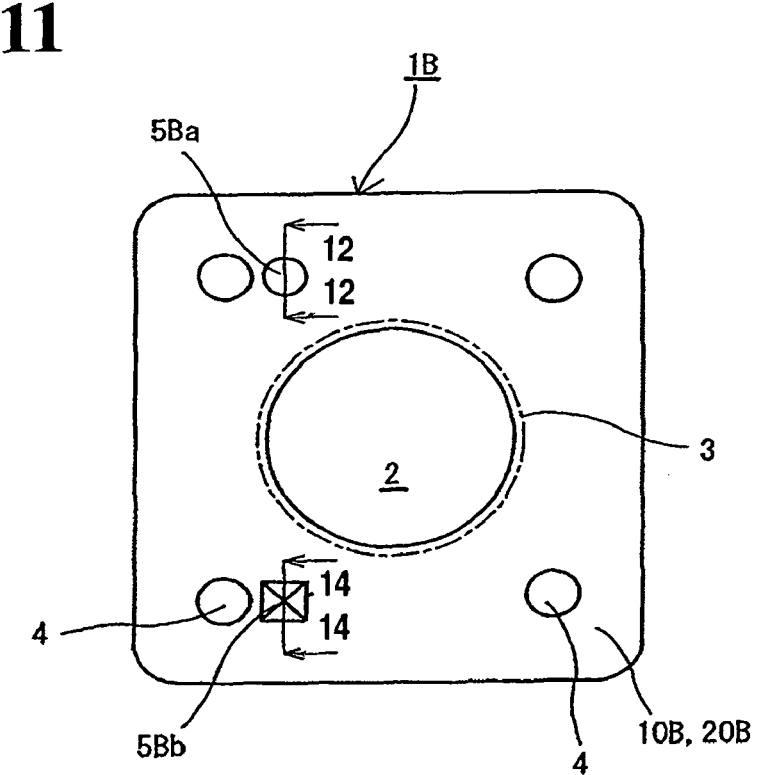
FIG. 11 is a plan view showing the metal gasket of the third embodiment of the present invention.
Figure 12:
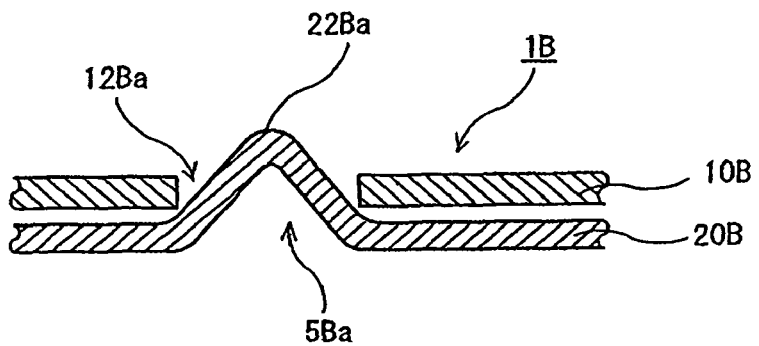
FIG. 12 is a sectional view taken along line 12-12 in FIG. 11.
Figure 13:
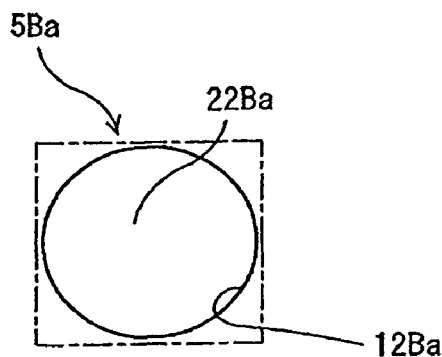
FIG. 13 is a fragmentary plan view showing the structure of the first positioning portion in FIG. 11.
Figure 14:
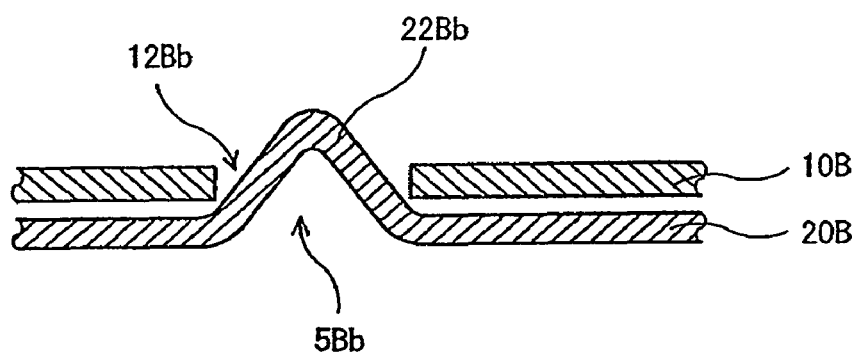
FIG. 14 is a sectional view taken along line 14-14 in FIG. 11.
Figure 15:
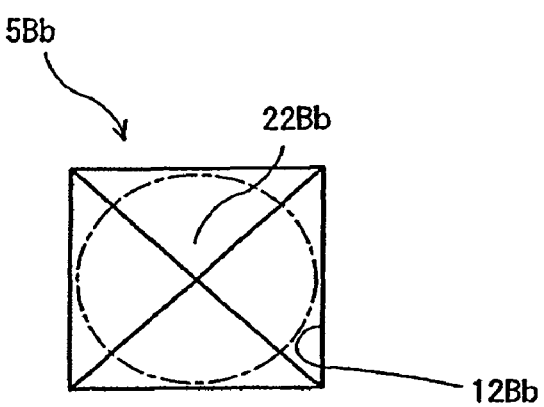
FIG. 15 is a fragmentary plan view showing the structure of the second positioning portion in FIG. 11.

Next, a method of manufacturing the metal gasket 1B will be explained. As shown in FIGS. 12 and 14, the first and second metal plates 10B, 20B are laminated, and assembled to the metal gasket 1B as shown in FIG. 11. During the assembly, when the metal plate 10B is laminated in a state that the front and back of the metal plate 10B are incorrect, the second positioning hole 12Bb faces the first positioning projection 22Ba, and the first positioning hole 12Ba faces the second positioning projection 22Bb. Therefore, when the front and back are incorrect, the second positioning projection 22Bb and the facing first positioning hole 12Ba cannot be fitted to each other.

Thus, if the assembly is not performed correctly, the second positioning projection 22Bb and second positioning hole 12Ba cannot be fitted to each other, so that the first and second metal plates 10B, 20B are not laminated suitably, and the assembler or observer can easily recognize the mistake. In this case, the front and back sides, attaching direction, and assembling sequence of the lamination of the respective metal plates 10B, 20B are accurately prepared, and the metal plates 10B, 20B are assembled again, or once they are removed from the manufacturing line, and once again, the correct front and back sides, correct direction, and correct assembling sequence of the lamination are prepared and returned to the manufacturing line.

When the first and second metal plates 10B, 20B are correctly laminated, the positioning projections 22Ba, 22Bb and the positioning holes 12Ba, 12Bb are fitted to one another, so that the first and second metal plates 10B, 20B are laminated normally. In this case, the positioning projections 22a, 22b projecting from the positioning holes 12a, 12b of the second metal plate 20B are pressed by the press and the like, crushed flatly, and press fitted, so that the first and second metal plates 10B, 20B are connected.

Next, the metal gasket of a fourth embodiment of the invention will be explained. As shown in FIGS. 16-20, a metal gasket 1C of the fourth embodiment consists of the same structure as the metal gasket 1B of the third embodiment except for the following respect.

The first metal plate 10C includes multiple positioning holes 5Ca, 5Cb shaped in such a way that one of the positioning holes 5Ca, 5Cb does not include the other positioning holes 5Ca, 5Cb when they overlap with respect to a predetermined direction determined by the planar shape of the metal gasket 1C. In the embodiment, a first positioning hole 12Ca is roundly punctured, and a second positioning hole 12Cb is squarely punctured.

Figure 18:
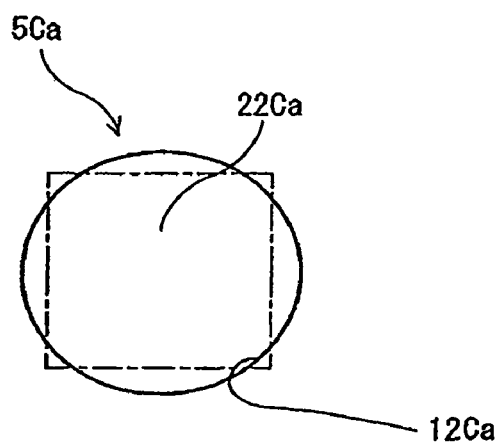
FIG. 18 is a fragmentary plan view showing the structure of the first positioning portion in FIG. 16.
Figure 20:
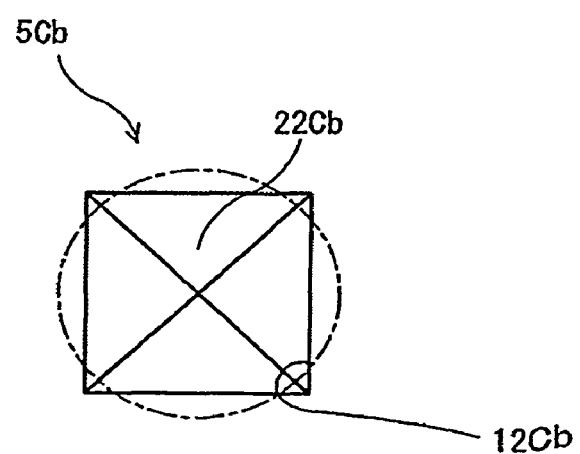
FIG. 20 is a fragmentary plan view showing the structure of the second positioning portion in FIG. 16.

As shown in FIGS. 18 and 20, the relationship in which one of the positioning holes 5Ca, 5Cb does not include the other positioning holes 5Ca, 5Cb when they overlap, and is shown wherein not only the second positioning hole 12Cb is not completely inserted into the first positioning hole 12Ca, but the first positioning hole 12Ca is not completely inserted into the second positioning hole 12Cb.

Figure 16:
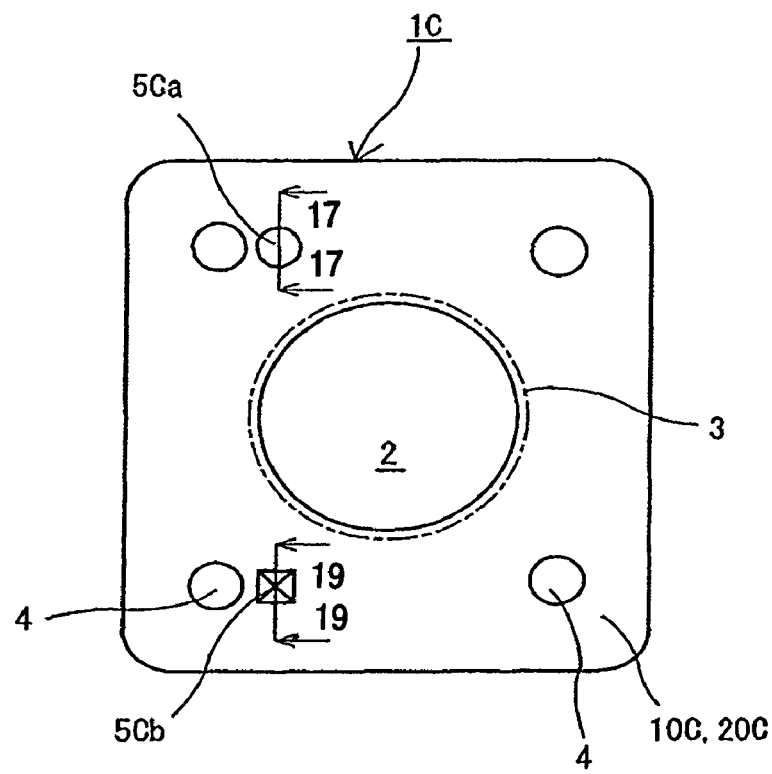
FIG. 16 is a plan view showing the metal gasket of the fourth embodiment of the present invention.
Figure 17:
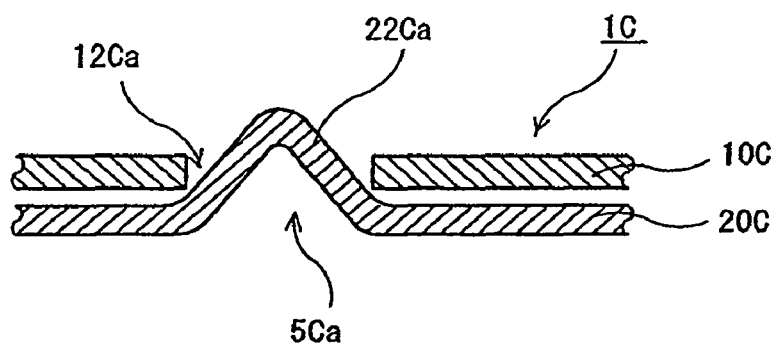
FIG. 17 is a sectional view taken along line 17-17 in FIG. 16.
Figure 19:
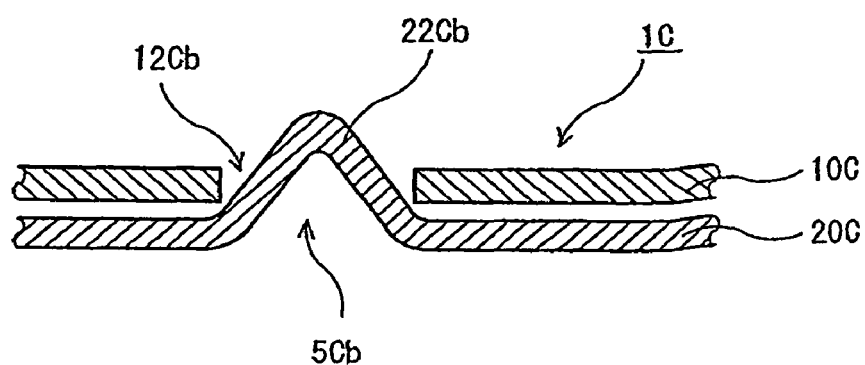
FIG. 19 is a sectional view taken along line 19-19 in FIG. 16.

Next, a method of manufacturing the metal gasket 1C will be explained. As shown in FIGS. 17, 19, the first and second metal plates 10C, 20C are laminated, and assembled to the metal gasket 1C as shown in FIG. 16. During the assembly, when the front and back sides of the metal plate 10C are laminated incorrectly, the second positioning hole 12Cb faces the first positioning projection 22Ca, and the first positioning hole 12Ca faces the second positioning projection 22Cb. Therefore, when the front and back sides are opposite, both the positioning projections 22Ca, 22Cb cannot be fitted into the facing positioning holes 12Cb, 12Ca respectively.

Thus, if the assembly is not performed correctly, the positioning projections 22Ca, 22Cb and positioning holes 12Ca, 12Cb cannot be fitted to one another, so that the first and second metal plates 10C, 20C are not laminated suitably, and the assembler or observer can recognize the mistake more easily.

When the first and second metal plates 10C, 20C are laminated correctly, the positioning projections 22Ca, 22Cb and the positioning holes 12Ca, 12Cb are fitted to one another, so that the metal plates 10C, 20C are laminated normally. In this case, the positioning projections 22Ca, 22Cb projecting from the positioning holes 12Ca, 12Cb of the first metal plate 10C are pressed by the press and the like, crushed flatly, and press-fitted, so that the first and second metal plates 10C, 20C are connected.

According to the methods of manufacturing the metal gaskets 1, 1A, 1B, 1C, during a normal assembly, the fitted positioning projections 22a, 22b-22Ca, 22Cb and the positioning holes 12a-12Bb, 32a-32Ab are structured so as not to be fitted to one another when the directions, front and back sides, and assembling sequence of the lamination of the metal plates 10-20C, 30A, 30B are incorrect. As a result, the assembler or observer can easily recognize the mistake when the directions, front and back sides, and assembling sequence of the lamination of the metal plates 10-20C, 30A, 30B are incorrect, so that an erroneous assembly can be prevented.

The disclosure of Japanese Patent Application No. 2006-330221, filed on Dec. 7, 2006, is incorporated in the application.

While the invention has been explained with reference to the specific embodiments of the invention, the explanation is illustrative and the invention is limited only by the appended claims.

The invention claimed is:

1. A metal gasket, comprising:
   a first metal plate having a first hole to be sealed, the first metal plate having a peripheral edge, and first positioning holes, the first positioning holes being formed in the first metal plate so as to be located inboard of and separate from the peripheral edge, and
   a second metal plate laminated under the first metal plate, and having a second hole to be sealed, and positioning projections made by the second metal plate and integrally formed with the second metal plate, said positioning projections facing corresponding first positioning holes and fitted into the facing corresponding positioning holes when the first and second holes are aligned together,
   wherein at least one of said first positioning holes does not match the other of the first positioning holes in case the first position holes are overlapped, and at least one of said positioning projections is not correctly fitted into the other of the first positioning holes.

2. A metal gasket according to claim 1, wherein said at least one of the first position holes has a shape or size different from the other of the first position holes.

3. A metal gasket according to claim 2, wherein said positioning projections have shapes or sizes corresponding to those of the first positioning holes.

4. A metal gasket according to claim 3, wherein said first positioning holes and said position projections are arranged such that only when the positioning projections are properly inserted into the first positioning holes, the first and second metal plates are laminated properly.

5. A metal gasket according to claim 1, wherein said positioning projections formed at the second metal plate have shapes different from each other.

6. A metal gasket according to claim 5, wherein said first hole has a size same as that of the second hole so that when the first and second metal plates are aligned by entering the positioning projections to the first positioning holes, the first and second holes are aligned.

7. A metal gasket according to claim 1, wherein the second metal plate has a peripheral edge, and the positioning projections are formed in the second metal plate so as to be located inboard of and separate from the peripheral edge thereof.

8. A metal gasket, comprising:
   a first metal plate having a first hole to be sealed, and first positioning hole, and
   a second metal plate laminated under the first metal plate, and having a second hole to be sealed, and positioning projections made by the second metal plate and integrally formed with the second metal plate, said positioning projections facing corresponding first positioning holes and fitted into the facing corresponding positioning holes when the first and second holes are aligned together,
   wherein at least one of said first positioning holes does not match the other of the first positioning holes in case the first position holes are overlapped, and at least one of said positioning projections is not correctly fitted into the other of the first positioning holes,
   the metal gasket further comprising a third metal plate laminated over the first metal plate and having a third hole to be sealed and second positioning holes, said second position holes being arranged to be overlapped over the first positioning holes and being smaller than the overlapped first positioning holes to be fitted into the respective positioning projections.

9. A metal gasket according to claim 8, wherein the second positioning holes have shapes corresponding to the overlapped first positioning holes.

10. A metal gasket according to claim 8, wherein each of said positioning projections has a shape pointed upwardly.

11. A metal gasket according to claim 10, wherein each of said positioning projection has a conical shape or a multiple side faces having one top.

12. A metal gasket according to claim 8, wherein the first metal plate has a peripheral edge, and the first positioning holes are formed in the first metal plate so as to be located inboard of and separate from the peripheral edge; and the second metal plate has a peripheral edge, and the positioning projections are formed in the second metal plate so as to be located inboard of and separate from the peripheral edge thereof.

* * * * *